United States Patent [19]

King et al.

[11] Patent Number: 5,600,775
[45] Date of Patent: Feb. 4, 1997

[54] METHOD AND APPARATUS FOR ANNOTATING FULL MOTION VIDEO AND OTHER INDEXED DATA STRUCTURES

[75] Inventors: Philip S. King; Hendrik W. Nelis, both of San Francisco, Calif.

[73] Assignee: emotion, inc., Palo Alto, Calif.

[21] Appl. No.: 296,535

[22] Filed: Aug. 26, 1994

[51] Int. Cl.$^6$ ..................................................... G06F 15/00
[52] U.S. Cl. ............................................. 395/806; 395/761
[58] Field of Search ................................... 395/154, 153, 395/155, 156, 144, 147, 145, 157, 160, 161

[56] References Cited

U.S. PATENT DOCUMENTS

| | | | |
|---|---|---|---|
| 4,616,336 | 10/1986 | Robertson et al. | 395/147 |
| 5,309,359 | 5/1994 | Katz et al. | 364/419.19 |
| 5,404,295 | 4/1995 | Katz et al. | 364/419.19 |
| 5,428,774 | 6/1995 | Takahashi et al. | 395/600 |
| 5,442,744 | 8/1995 | Piech et al. | 395/154 |
| 5,502,727 | 3/1996 | Catanzaro et al. | 370/94.2 |
| 5,513,306 | 4/1996 | Mills et al. | 395/148 |
| 5,517,652 | 5/1996 | Miyamoto et al. | 395/800 |
| 5,524,193 | 6/1996 | Covington et al. | 395/154 |
| 5,550,965 | 8/1996 | Gabbe et al. | 395/154 |

OTHER PUBLICATIONS

Lee et al., "Video Indexing—An Approach based on Moving Object and Track", Proceedings of Storage and Retrieval for Image and Video Databases, pp. 25–36. Feb. 1993.
Nagasaka et al., "Automatic Video Indexing and Full–Video Search for Object Appearances", Visual Database Systems, (Knuth et al., eds.), pp. 113–126. Jan. 1992.
Weber et al., "Marquee: A Tool for Real–Time Video Logging", CHI '94. Apr. 1994.
Minneman et al., "Where Were We: making and using near–synchronous, pre–narrative video", Multimedia '93, pp. 1–11. Dec. 1993.
Phillips, "MediaView: a general multimedia digital publication system", Comm. of the ACM, v. 34, n. 7, pp. 75–83. Jul. 1991.

*Primary Examiner*—Mark K. Zimmerman
*Assistant Examiner*—Joseph R. Burwell
*Attorney, Agent, or Firm*—Wilson Sonsini Goodrich & Rosati

[57] ABSTRACT

Full motion digital video frames, or other indexed data structures, are annotated with text, graphics, and digital audio without modifications to the original video information. The video and annotations are stored separately. An indexing scheme relates the annotations to the video frames. On full motion video playback, the annotations are displayed on the originally annotated frames. The technique involves displaying the file of indexed data structures using a file display routine, and selecting in response to user input an indexed data structure to be annotated from the file of indexed data structures being displayed. Next, an annotation data structure is created in response to user input using an annotation routine without modifying the selected data structure. The annotation data structure includes a graphical element for display overlaying the selected data structure and an indication of an index value for the selected data structure. The annotation data structure is stored in an annotation memory apart from the file of indexed data structures. During playback, the annotation memory is monitored to detect annotation data structure for indexed data structures currently being displayed. If an annotation data structure is detected for the current indexed data structure, a graphical element overlies the indexed data structure on the display without modifying the indexed data structure. Text process documents can be handled much in the same manner. Also, annotation from several users may be merged and viewed in one batch.

48 Claims, 8 Drawing Sheets

METHOD AND APPARATUS FOR ANNOTATING FULL MOTION VIDEO AND OTHER INDEXED DATA STRUCTURES

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to techniques for annotating indexed data files with text, graphics, and audio without modifying the original indexed data; and more particularly to systems for annotating full motion digital video.

2. Description of Related Art

The development of high quality "multimedia content" typically involves participation of a number of artists who may be geographically dispersed, or may have separate work stations at which their contribution to the multimedia product may be added. Typically, such content is stored in indexed data structures, such as video frames, which are indexed by a frame number. Data linked to particular video frames, such as sound and related text, are keyed to this indexing structure.

Multimedia content is often complex, drawing on a number of sources of information, and containing large amounts of data which is expensive to transport and share among developers. Thus, changing data in a vast file of indexed data structures, such as a multimedia product, should be avoided. To alter the original product would lose the content of the original product. However, in order to send information about changes to another developer, at least the altered portion of the original product must be transported or some technique must be used to identify that altered portion. This can be done by taking snips of the entire product, altering it, and transferring the altered snip to the other developer for viewing, or by direct real time communication between the commenter and other developers to whom the comments are directed. Difficulties with these approaches are apparent. In particular, to make snips of altered multimedia content, involves developing data files which are taken out of the context of the original work and must be either delivered on tape to other developers, or transported across a network. Also, a snip of even one or two video frames in a multimedia product may involve megabytes of data. Because of the large size of these files, transporting such information across the network can be costly, and time consuming.

The difficulties of having real time interaction among developers are also apparent. That is, when a large number of developers are involved in a big project, it is simply physically impossible to have all the people who need access to proposed changes present at the time these changes are being developed.

Accordingly, it is desirable to provide an annotation tool that allows reductions in production time, more effective utilization of resources, and greater communication in general during creation of multimedia products or other large scale indexed data files.

SUMMARY OF THE INVENTION

The present invention provides an efficient, accurate method and apparatus for annotating full motion digital video, or other indexed data files. The method allows full motion digital video frames to be annotated with text, graphics, and digital audio without modifications to the original video information. The video and annotations are stored separately. An indexing scheme relates the annotations to the video frames. On full motion video playback, the annotations are displayed on the originally annotated frames. The annotations can be manipulated independently of the video information. For example, the annotations and video can be transported separately, while the indexing scheme allows the annotations and the video to be recombined at the receiving station.

The invention can be characterized as a method of annotation for a file of indexed data structures. The method includes displaying the file of indexed data structures using a file display routine, and selecting in response to user input an indexed data structure to be annotated from the file of indexed data structures being displayed. Next, an annotation data structure is created in response to user input using an annotation routine without modifying the selected data structure. The annotation data structure includes a graphical element for display overlaying the selected data structure and an indication of an index value for the selected data structure. The annotation data structure is stored in an annotation file apart from the file of indexed data structures. During playback, the annotation file is monitored to detect annotation data structures for indexed data structures currently being displayed. If an annotation data structure is detected for the current indexed data structure, a graphical element overlies the indexed data structure on the display without modifying the indexed data structure. As mentioned above, the file of indexed data structures may comprise full motion video, while the index value identifies an individual video frame. Also, during the step of overlaying the current video frame with a graphical element of an annotation data structure, the playing of the full motion video is stopped at the current frame.

According to another aspect of the present invention, a graphical user interface is provided, having a window for displaying the indexed data structures, and an annotation control window. The annotation control window includes graphical input elements providing access to tools for providing user input, for selecting a frame to be annotated, and for creating annotations.

The types of annotations which can be created according to the present invention include free-hand bitmap drawings, text, and audio data. When audio data is used, an icon is used as the graphical element of the annotation data structure, which can be displayed over the indexed data structure to indicate presence of an audio annotation. Also, the annotation graphical element can be positioned on the screen overlaying the indexed data structure using a pointer device which inputs coordinate data for the annotation data structure.

The present invention can also be characterized as an apparatus for display and annotation of a file of indexed data structures. This apparatus includes a display, and a media manager, including resources to display the file of indexed data structures on the display. Also included is a device for user input. An annotation manager includes resources to select in response to user input an indexed data structure to be annotated and resources to create, in response to user input, an annotation data structure, without modifying the selected indexed data structure, and to store the annotated data structure in an annotation file. Also, playback resources are included which monitor the annotation file while the file of indexed data structures is displayed by the media manager to detect annotation data structures for indexed data structures currently being displayed, and that overlie the indexed data structure on the display with the graphical element of the annotation data structure.

In this aspect, the user input may include a graphical user interface which has a window for displaying the indexed data structures by the media manager, and an annotation control window which includes graphical input elements providing access to tools for providing user input to the annotation manager. The tools may include a drawing tool, a text input tool, and an audio input tool. Also, a pointer tool may be used for providing user input to manipulate the graphical user interface.

In another feature of the present invention, a number of independent annotators can have the annotations they create merged into a single merged annotation document, so that their annotations are displayed in a single play back of the movie. Thus, the present invention provides resources to merge independently created files of annotation data structures into a merged annotation document.

Accordingly, a full range of annotation capabilities usable by creative professionals to comment and edit on multimedia content are provided. The annotations can be made in free-hand using graphic pens of various sizes and colors, also media content can be annotated by typing text to overlie media contents. Further, voice-based annotations can be made by simply recording voice comments using easy to use voice controls provided by graphical user interface.

Other aspects and advantages of the present invention can be seen upon review of the figures, the detailed description, and the claims which follow.

DETAILED DESCRIPTION OF PREFERRED EMBODIMENTS

A detailed description of a preferred embodiment of the present invention is provided with respect to the figures.

Figure 1:
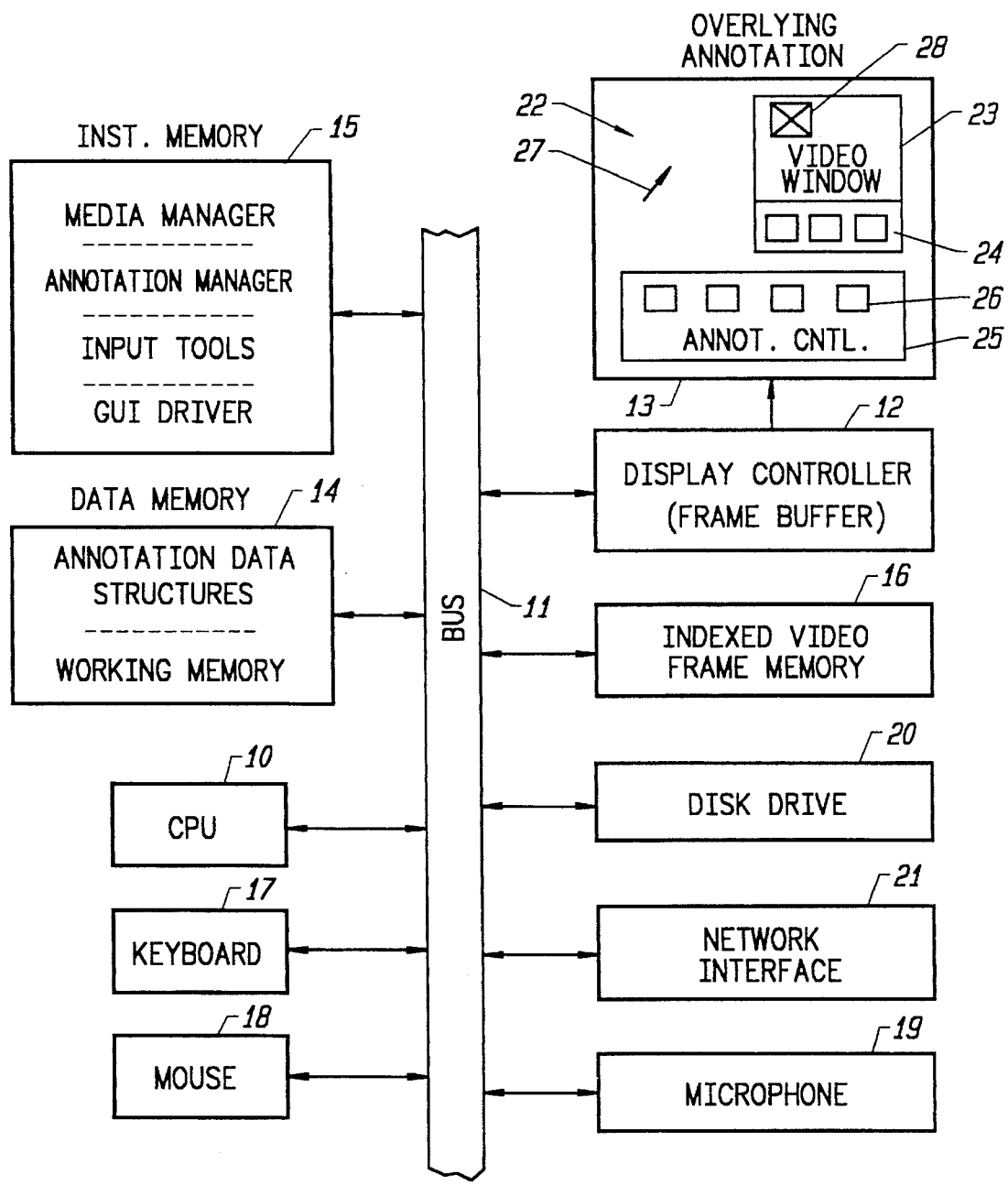
FIG. 1 is a simplified system block diagram of an annotation system according to the present invention.

FIG. 1 illustrates the basic system implementing the present invention. The figure represents, for instance, the architecture of an Apple Macintosh computer, manufactured by Apple Computers of Cupertino, Calif. The system includes a CPU 10 coupled to a bus 11. A display controller 12 is coupled to the bus 11, the display controller including a frame buffer. The display controller drives a monitor 13 displaying a graphic user interface, as schematically illustrated.

Coupled to the bus 11 are a data memory 14 and an instruction memory 15. Also coupled to the bus are an indexed video frame memory 16, such as a digital video storage medium like laser disk, compact disk, video tape, or the like.

In addition, coupled with the bus 11, are input devices like a keyboard 17, a mouse 18, and a microphone 19. The system may also be coupled to a disk drive 20, providing non-volatile storage, and a network interface 21, which allows for communication with other systems.

According to the present invention, the instruction memory stores software which includes a media manager, an annotation manager, input tools, and a graphic user interface (GUI) driver.

The graphic user interface driver manages the graphic user interface, generally 22, in the monitor 13. As can be seen, the interface includes a video window 23 for displaying the indexed data structures. The video window may include graphic input elements 24, which are used to indicate standard video playing features like a play button, a rewind button, a pause button, and the like. Also, a graphic user interface 22 includes an annotation control window 25 according to the present invention. The annotation control window 25 includes graphic input elements, e.g., 26, which are used in the annotation process, as discussed in detail below.

The media manager stored in the instruction memory 15 is used to play the indexed video frames stored in the indexed video frame memory 16 in the video window 23. The media manager may comprise, for instance, "Quick-Time" which is adapted for execution on Apple Macintosh computers, produced by Apple Computers, Inc., of Cupertino, Calif.

Also, an annotation manager is included in the instruction memory 15. The annotation manager interfaces with the media manager, the input tools, and the graphic user interface driver for the creation and playing back of annotations. Also, it manages annotation data structures in the data memory 14 which are used in this process. The annotation manager may have interfaces for a variety of media managers, allowing a single annotation manager product to enable annotation of a wide variety of indexed data structures, which are created for specific media managers. Thus, while a multimedia developer must have a number of media manager programs to handle the variety of media encountered, only one annotation manager is needed, and only one annotation interface must be learned.

Input tools in the instruction memory 15 are coupled with the keyboard 17, mouse 18, microphone 19, and possibly other input devices in order to store input data into the annotation data structures in the data memory 14. The graphic user interface driver may manage a pointing device which is responsive to the mouse 18 to position a cursor 27 on the screen, the cursor 27 being used for selecting buttons (e.g., button 26) on the graphic user interface 22. Also, the cursor 27 may be used in combination with the mouse 18 and a drawing input tool for developing hand-drawn bitmap images. According to the present invention, a graphical element is associated with each annotated data structure. This graphic element is displayed as an overlaying annotation 28 in the video window 23, where the annotation overlies the video frame, without modifying the video frame during playback of an annotated file.

Figure 2:
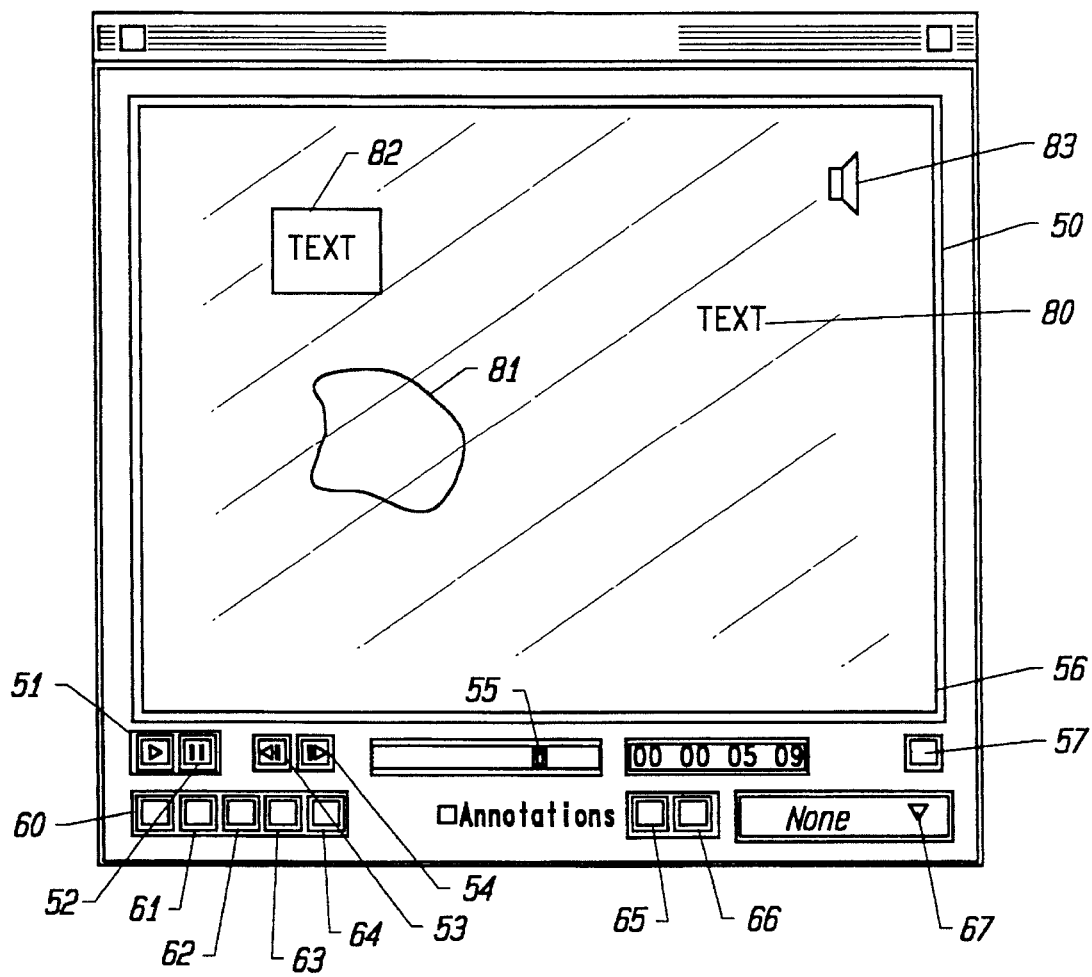
FIG. 2 illustrates a graphical user interface developed for a preferred embodiment of the present invention.

FIG. 2 illustrates a preferred graphic user interface for use with a full motion video annotation system according to the present invention. Under this graphic user interface, a video window, generally 50, is included. Below the video window are graphic elements providing access to tools for managing the video playback. These include a button 51 corresponding to a play button on the playback mechanism, a button 52 corresponding to a pause button. Also, a step back button 53 and a step forward button 54 are included. In addition, a location slider 55 indicating the position in the video file is included. The slider 55 may be used with a dragging routine to rapidly select a position in the file.

Associated with the media manager also is an index display 56, which in this example indicates the relative time of the frame currently being displayed, as used by the "QuickTime" routine as a frame index. An audio control button 57 is provided with the video playback manager. Selecting this button will open a window which can be used for managing audio volume.

Associated with the annotation manager are also a number of graphical input elements which represent corresponding tools. Selecting any of the annotation tools starts the annotation process. These tools include an annotation pointer button 60. Using this button enables the pointer to operate with the annotation process.

Also included are a text input tool 61, which when selected, is used for entering text annotations (e.g., 80) which will overlie the screen (displayed in the foreground) at a selected position. A drawing tool 62 is included, which is used in combination with the cursor to draw a free-hand bitmap image (e.g., 81) which is used as an annotation. A note tool input 63 is included, which, like a text tool, is used for entering text annotations, but provides a note background (e.g., 82) for the annotation. Finally, an audio button 64 is included, which is used to enable inputting of audio annotations. When an audio annotation is created, an audio annotation icon (e.g., 83) is used as a graphical element for the annotation, and will overlay an annotated frame during playback to indicate presence of the audio annotation. Implementation of text input tools, bitmap input tools and audio input tools can take a variety of forms known to developers skilled in the art. For instance, in an embodiment implemented for the Macintosh environment, input tools developed using the Essential Tools and Objects package available from Apple Computers, Inc., may be used.

In addition, the annotation tool includes playback buttons, including a button 65 used to jump to the previous annotation in the annotation list for a given work, and a button 66 used to jump to the next annotation in an annotated work. Finally, a pulldown menu 67 is included, which is used for providing a list of annotation names.

In a preferred system, a number of tools are provided to facilitate communication of the media being annotated and the annotations themselves.

Thus, in using the present invention, a movie is viewed in response to user input on the graphic user interface. For instance, a view media button on the control strip for the media manager is clicked to open a view media dialogue box. A medium is selected for viewing by double clicking on a list of available media. Also, annotation files may be listed with the media files. Double clicking on annotation files results in playing back of the associated media with annotations. Next, the play button (e.g., 51) is clicked on the screen to play the movie. If the movie was opened with an annotation file, playback pauses on the first annotation. To reach the next annotation, the play button is clicked again, and the media plays uninterrupted to the next annotation.

To annotate a movie, the process involves playing the movie in a movie playback window. The pause button is clicked to stop on a selected frame. Next, an annotation tool button (61, 62, 63, 64) is clicked to open an annotation dialogue box. Using the dialogue box, the annotation is added, such as a text annotation, a note tool annotation, a drawing tool annotation, or an audio tool annotation.

To change the text in an annotation, a format or edit menu may be provided with the annotation tool. Also, an annotation may be selected using a selection pointer accessed by button 60 to select an annotation for deletion or editing.

The annotation process involves creating an annotation data structure apart from the indexed data structure of the video file. This annotation data structure includes an indication of the index of the annotated frame, a graphical element which is displayed overlaying the annotated frame when it is displayed, and a data field storing the actual data of the annotation. The annotation data structure can be communicated independently of the video frame, does not alter the video frame, and can take on the format most effective for communicating the particular annotation desired.

Figure 3:
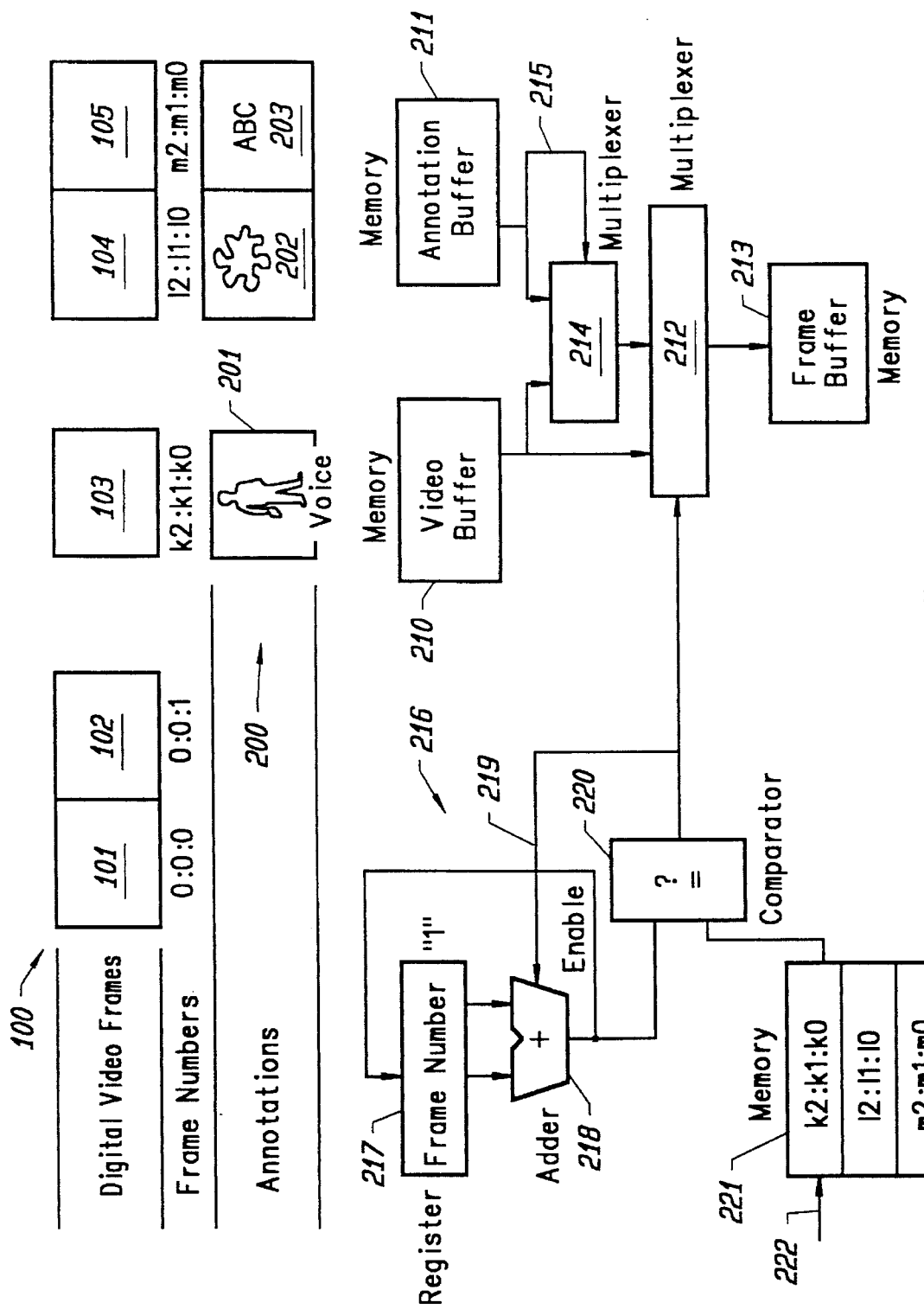
FIG. 3 is a heuristic diagram illustrating the indexing technique used according to the present invention.

FIG. 3 is a heuristic diagram illustrating the indexing technique used according to the present invention. As indicated above, the multimedia content may be stored as a file of digital video frames, generally 100. This file will include a number of indexed data structures 101, 102, 103, 104, 105. The indexed data structures 101–105 will have a frame number associated with it. In QuickTime, the index is a video timing parameter. Thus, as illustrated, frame number 101 has frame number 0:0:0. Frame 102 has frame number 0:0:1. Frame 103 has frame number k2:k1:k0. Frame 104 has frame number l2:l1:l0 and frame number 105 has frame number m2:m1:m0.

A number of annotation data structures, generally 200, are also stored in the system. For instance, a voice structure 201 is stored as an annotation data structure. A hand-drawn structure 202 is included, and a text structure 203 is included. The voice structure 201 includes the index k2:k1:k0 so that it may be correlated with the annotated frame 103. Similarly, annotation 202 includes the index l2:l1:l0, and annotation 203 includes the index m2:m1:m0.

The digital video frames 100, during playback, are loaded one by one into a video buffer 210. The annotation data is loaded in parallel into an annotation buffer 211. The video buffer is loaded through a multiplexer 212 into the frame buffer 213 in the video controller for playing on the screen. The annotation buffer is also coupled into the frame buffer path through multiplexer 214. The multiplexer 214 selects either video or annotation data in response to a control signal on line 215 which is part of the annotation data structure which provides for overlaying an annotation graphic on a video frame, without altering the video frame in the video buffer 210. The output of the multiplexer 214 is supplied through multiplexer 212 into the frame buffer when selected. The multiplexer 212 is controlled by the indexing logic, generally 216. The indexing logic keeps track of the frame number in a frame number register 217 of a current frame. This frame number is supplied through an adder 218 which has a constant 1 at its other input. The adder 218 is enabled by the signal on line 219 at the output of the comparator 220. The comparator 220 compares the output of the adder 218 with the index values stored in the annotation data structures in memory 221. The first annotation data structure in the file of annotation data structures, such as the file 200 above, will have the index value k2:k1:k0. Thus, when the frame number in register 217 equals k2:k1:k0, the combined video buffer and annotation buffer output is selected through the multiplexer 212 into the frame buffer, with the annotation graphic overlaying the video data. Similarly, the memory 221 will have the indexes I2:I1:I0, and m2:m1:m0 stored for comparison during additional playing of the file 100.

When the output of the comparator is true, the incrementing adder 218 is disabled by the signal on line 219, and the multiplexer 212 is controlled to manage the overlaying of the graphical element of the annotation data structure. The further playing of the digital video frames is enabled by user input, which overrides the signal 219 to begin incrementing frame numbers. This may be accomplished, for instance, by shifting a pointer, generally 222, in the memory 221, which stores the annotation data structures.

An indexing process like that explained with reference to FIG. 3 might be implemented, for instance, by managing the QuickTime interface in the manner shown by the sample of source code in the APPENDIX.

A file of the annotation data structures, according to the preferred embodiment, has a structure illustrated in the table below.

TABLE

```
TAnnotations                              //annotation document
    CMediaId *fMediaId;                   //pointer to media identifier - file being
                                          //   played
    VPoint fResolution;                   //resolution annotations were made at
    TAnnotationList *fAnnotationList;     //pointer to actual annotation data
TAnnotationList
    TAnnotations *fAnnotations;           //pointer back to annotation document -
                                          //   TAnnotation
    TNoteList *fNoteList;                 //pointer to notes array
    long fSize;                           //number of annotations of CAnnotation
                                          //   classes in list
    CAnnotation fData [fSize];            //array of actual annotation data <list>
CAnnotation
    ArrayIndex fFirstNote;                //index in note list of first note
    ArrayIndex fLast Note;                //index in note list of last note
    long fValue;                          //index of annotation in media frame time
                                          //   in Quicktime ™
    CStr31 fName;                         //name of annotation
CMediaId
    long     IdVersion;                   //For compatibility this should always be
                                          //   1st
    long     IdSize;                      //For compatibility this should always be
                                          //   2nd
    long     FileSize;                    //size of indexed data structure, i.e., video
                                          //   file
    long     FileCreationData;            //creation date
    long     FileModDate;                 //modification date
    Str63    FileName;                    //file name of video file
TNoteList
    long fSize;                           //size of CNote data array
    CNote fData [fSize];                  //CNote data array
union CNote                               //structure of CNote
    IDType fType;                         //indicates type of note
    VRect fBounds;                        //bounds of note (position on screen)
    fFreehandNote:                        //fType == 'free'
        VPoint **fPoints;                 //data
        long fNumberOfPoints;             //number of points
        CRGBColor fColor;                 //color
        CPoint fPen;                      //pen type
    fVoiceNote:                           //fType == 'voic'
        Handle fSound;                    //pointer to sound file
        long fSoundOffset;                //offset in sound file
        long fSoundSize;                  //size of note
    fTextNote:                            //fType == 'text'
        TEStyleHandle fStyles;            //pointer to style data
        STHandle fElements;               //pointer to elements of note
        Handle fText;                     //pointer to text of note
        Boolean fEditing;                 //edit enable/disable
    fTextTabNote:                         //fType == 'txtb'
        TEStyleHandle fStyles;            //pointer to style data
        STHandle fElements;               //pointer to elements of note
        Handle fText;                     //pointer to text of note
        Boolean fEditing;                 //edit enable/disable
        CRGBColor fColor;                 //color
        Boolean fOpen;                    //open or not
        VRect fOpenBounds;                //position within note?
enum AnnotationMessage {
    messOpenAnnotation,                   //open annotation at the value indicated
```

TABLE-continued

| | |
|---|---|
| | //by data (long) |
| messCloseAnnotation, | //close annotation if data points to true |
| | //boolean the annotations should be |
| | //erased, otherwise leave them on |
| messDrawAnnotation | //redraw the annotation for the current |
| | //value |
| }; | |

The annotation data file is named TAnnotations. It includes a number of annotation data structures, labelled CNote. These data structures may take the structure of a FreehandNote, a VoiceNote, a TextNote, or a TextTab note.

The annotation document TAnnotations includes a pointer to the media identifier which identifies the file being annotated (CMediaId), a value indicating the resolution at which annotations were made (Vpoint), and a pointer to an annotation list (TAnnotationList). The annotation list is stored in a data structure called TAnnotationList. This data structure includes a pointer back to the original annotation document (TAnnotations), a pointer to the array of annotation data structures (TNoteList), a variable indicating the number of annotations in the list, and the array of actual annotation data called CAnnotation.

The CAnnotation structure includes an Array Index (fFirstNote) indicating the index in the medium being annotated of the first note in the list, and an Array Index (fLastNote) of the last note in the list. Also, a variable indicating the actual index of the annotation in the media, and a field providing the name of the annotation CStr31 are included.

The CMediaId data structure includes a number of variables indicating the characteristics of the multimedia file to be played. These variables include an identifier, a variable indicating the size of the identifier, a file size indicator, a creation date and a modification date indicator, and a file name.

The data structure TNoteList has a variable indicating the size of the note list, and an array of CNote data structures which store the actual annotation data. The CNote data structures include an identifier of the type of note, a variable VRect indicating the position (coordinates) of the note on the frame, and data used to implement the note. For the free-hand note (fFreehandNote), this data includes an array of graphical points to be drawn, a variable indicating the number of points, a variable indicating the color, and a variable indicating the type of pen used to create the points.

For the fVoiceNote, the data structure includes the actual sound data, a data structure indicating the offset of the sound data in memory, and a variable indicating the size of the sound file.

For the fTextNote, the structure includes a variable indicating the style used to create the text, the textual elements, the text and a boolean indicating whether editing has been enabled. For the fTextTabNote, similar elements with the TextNote are used in addition to the background color, whether or not the field is open, and the bounds of the background field.

FIGS. 4–8 illustrate the process used in creating and playing back annotations according to the present invention.

Figure 4:
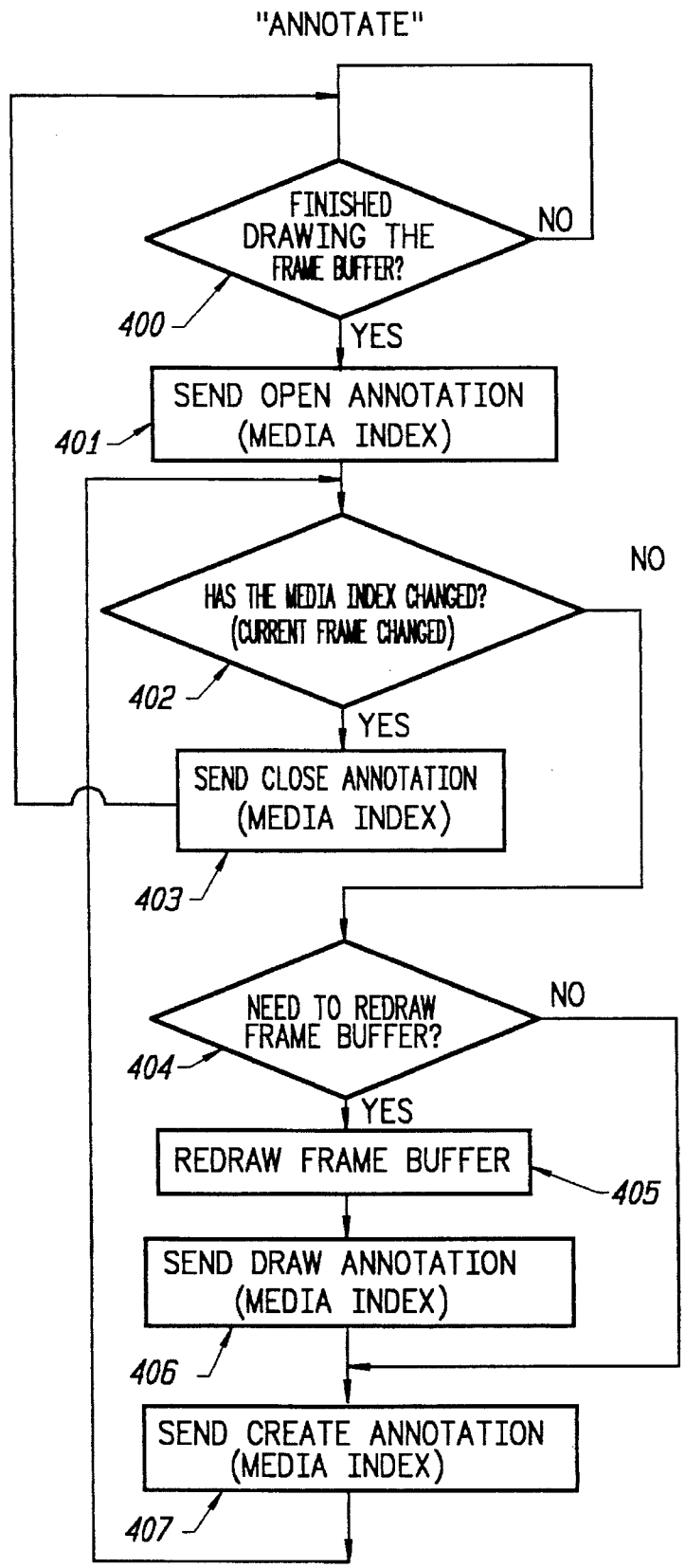
FIG. 4 is a flow diagram of the routine used in annotating digital video by the annotation system of the present invention.

FIG. 4 illustrates the routine used for annotating a file. First, the media manager sits in a loop drawing the frame buffer with the current video frame. Thus, the annotation manager detects whether the media manager is finished drawing the frame buffer (block 400). If not, then the loop continues until the frame buffer is finished. If the frame buffer is finished drawing, then the annotation manager detects whether an as from the OPEN ANNOTATION routine of FIG. 7 or user selection of the annotate button) has been received for opening an annotation at the media index of the current buffer by sending an OPEN ANNOTATION (MEDIA INDEX) message (block 401). If yes, then the mechanism enters a loop, detecting whether the media indexed has changed (block 402). If it has changed, then the annotation is closed for this media index (block 403), and the algorithm loops back to block 400.

The annotation is closed in response to a CLOSE ANNOTATION (MEDIA INDEX) message by unloading the annotation data structure from the annotation manager and restoring it to the annotation file apart from the video file.

If the media index has not changed at block 402, then the algorithm determines whether the frame buffer needs redrawing (block 404). If yes, then the frame buffer is redrawn (block 405), and the annotation is drawn for the annotation data structure having the media index of the current buffer by sending a DRAW ANNOTATION (MEDIA INDEX) message (block 406). Next, the algorithm determines, by sending a CREATE ANNOTATION (MEDIA INDEX) message, whether an indication is received for creating an annotation at the media index of the current buffer, such as by a user selecting an annotation tool button (block 407). If not, then the algorithm loops to block 402 to wait for the media index to change. If the frame buffer does not need redrawing at block 404, then the algorithm sends the CREATE ANNOTATION (MEDIA INDEX) message for the current frame buffer at block 407.

Figure 5:
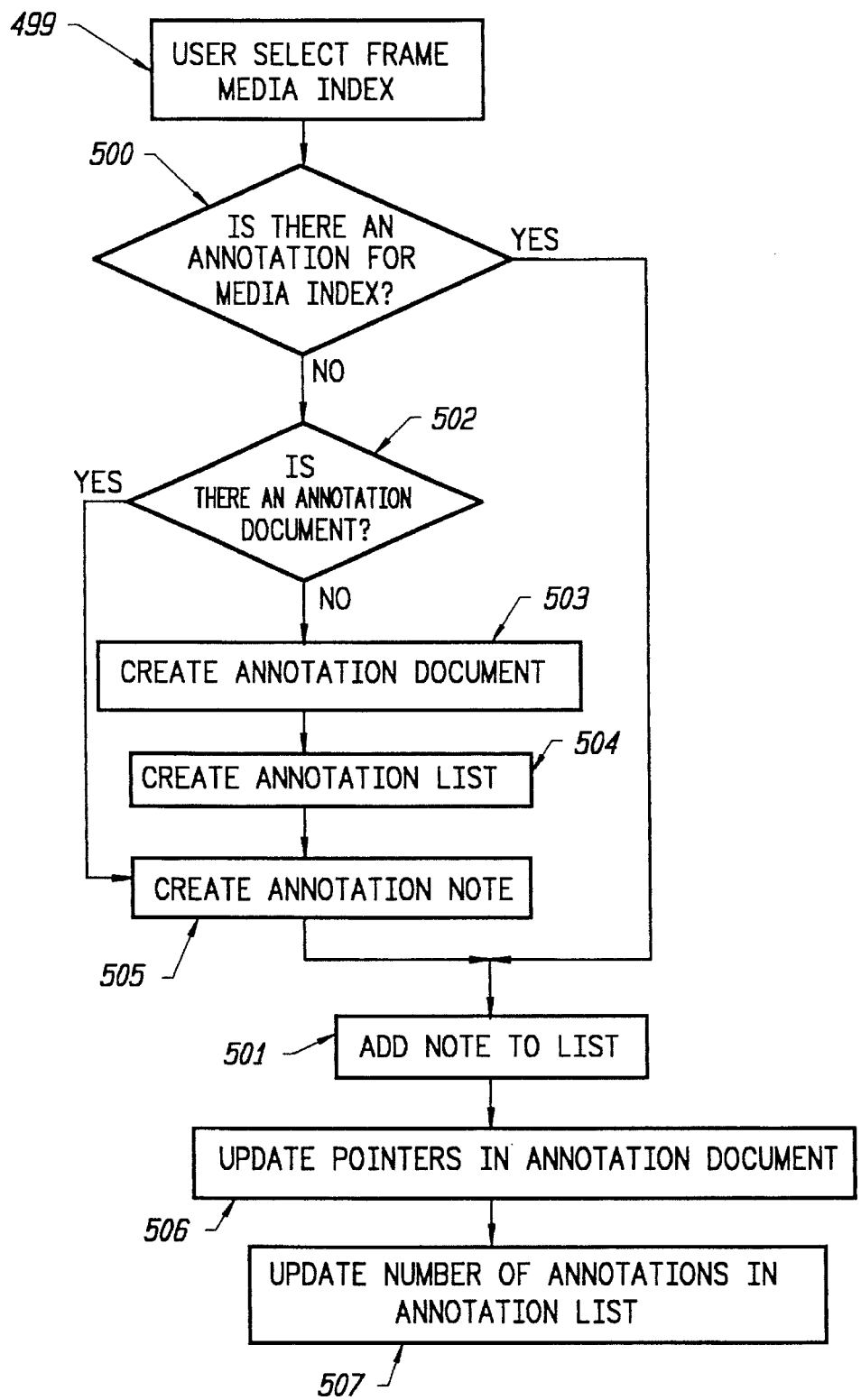
FIG. 5 is a flow diagram of the "create annotation" routine entered as shown in FIG. 4.

FIG. 5 illustrates the CREATE ANNOTATION message. The CREATE ANNOTATION message is begun where a user selects a frame having a current media index to annotate (block 499). Then the routine tests to determine whether an annotation is open for the current media index (block 500). If so, then the open annotation is added to the NoteList for the annotation document at this media index (block 501). If not, then the algorithm determines whether an annotation document exists for the current media index (block 502). If yes, then an annotation is created at block 503, and the algorithm loops to block 501 to add the note to the NoteList. If no annotation document exists, then an annotation document is created (block 503).

Next, an annotation list is created (block 504) for this media index. Finally, the annotation note is created at block 505 and the algorithm loops to block 501 where the note is added to the NoteList for the medium.

When a note is added to the NoteList for the medium, the pointers in the annotation document are updated (block 506), and the number of annotations indicated for the AnnotationList is updated (block 507).

Figure 6:
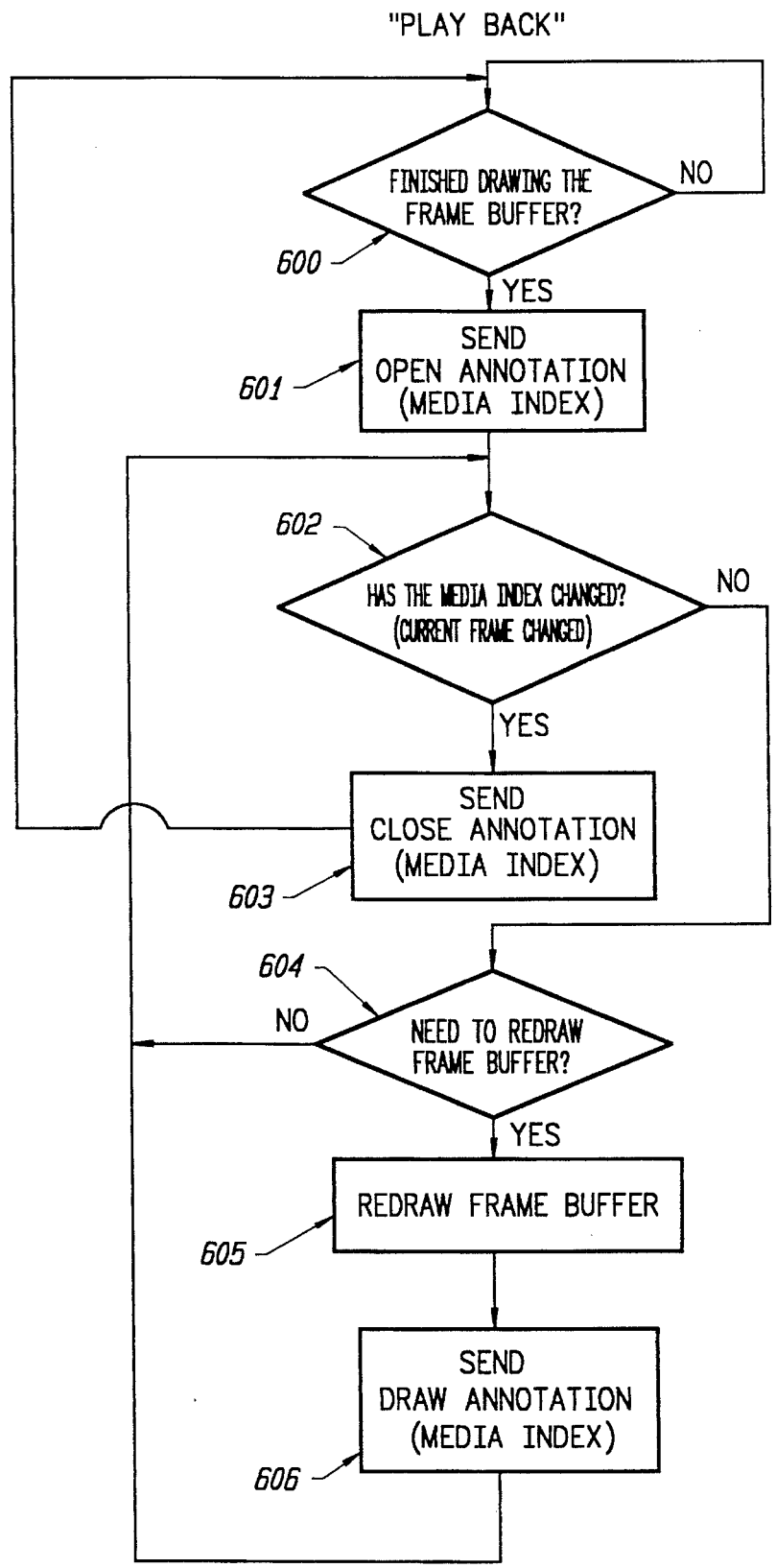
FIG. 6 is a flow diagram of the routine used playing back annotated video by the annotation system of the present invention.

FIG. 6 illustrates the playback routine. Note that it is identical to the create routine of FIG. 4, with the exception of block 407. In FIG. 6, the playback routine involves a loop for drawing the frame buffer for a current video frame (block 600). When the frame is finished drawing, the algorithm sends the OPEN ANNOTATION message, which determines whether an indication is received, such as a gesture by the user for the create routine, or a match on the index of the current frame with an index in the annotation list (block 601). If the open annotation indication is received, then the algorithm enters the loop to determine whether the media index has been updated (block 602). If yes, then the annotation is closed by sending a CLOSE ANNOTATION (MEDIA INDEX) message (block 603) and the algorithm loops back to block 600.

The annotation is closed in response to a CLOSE ANNOTATION (MEDIA INDEX) message by unloading the annotation data structure from the annotation manager and restoring it to the annotation file apart from the video file.

If the media index is not changed at block 602, then the algorithm tests whether the frame buffer needs to be redrawn at block 604, and, if yes, redraws the frame buffer at block 605. Next, the annotation is drawn overlaying the frame buffer for this media index by sending an OPEN ANNOTATION (MEDIA INDEX) message (block 606), and the algorithm loops back to block 602 to wait for the media index to change. Also, block 602 is entered if the frame buffer does not need to be redrawn for the current annotation.

Figure 7:
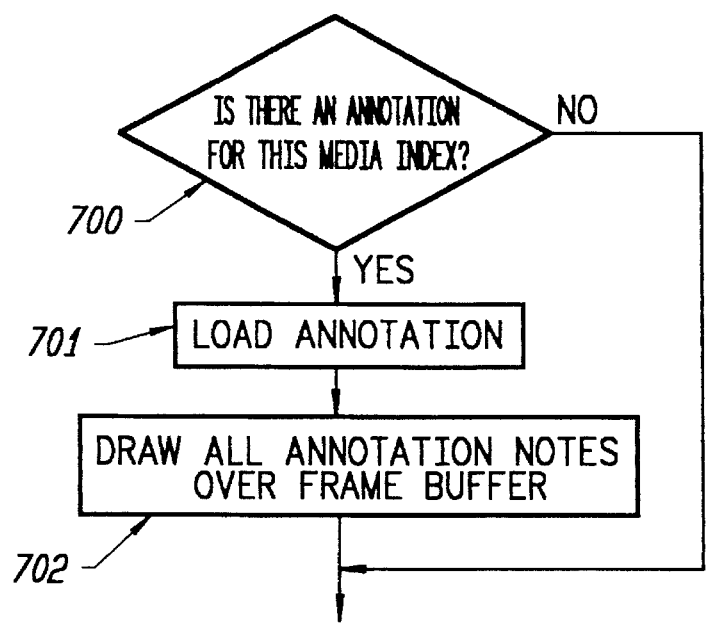
FIG. 7 illustrates the "open annotation" routine entered in the annotate routine of FIG. 4 and the playback routine of FIG. 6.

FIG. 7 illustrates the OPEN ANNOTATION message which is entered from block 601 of the playback routine of FIG. 6 and block 401 of the annotate routine of FIG. 4. This routine first determines whether there is an annotation in the AnnotationList for the current media index (block 700). If no, a negative reply is issued. If yes, the annotation is loaded (block 701) and the annotation manager draws all the notes in the annotation on top of the frame buffer (block 702).

Figure 8:
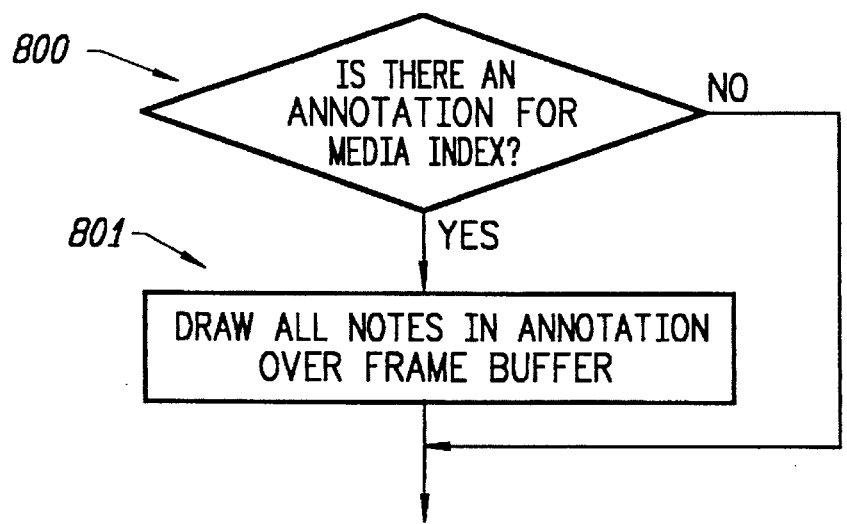
FIG. 8 is a flow chart of the "draw annotation" routine entered in the annotate routine of FIG. 4 and the playback routine of FIG. 6.

FIG. 8 illustrates the DRAW ANNOTATION message which is executed at block 405 in FIG. 4 and at block 606 in FIG. 6. This loop determines whether an annotation has been opened for the frame at the current media index (block 800). If yes, then all the notes in the annotation are drawn on top of the frame buffer (block 801). If no annotation is opened, then no annotation is to be drawn and the algorithm returns a negative response to the loop of FIG. 4 or FIG. 6, respectively.

Figure 9:
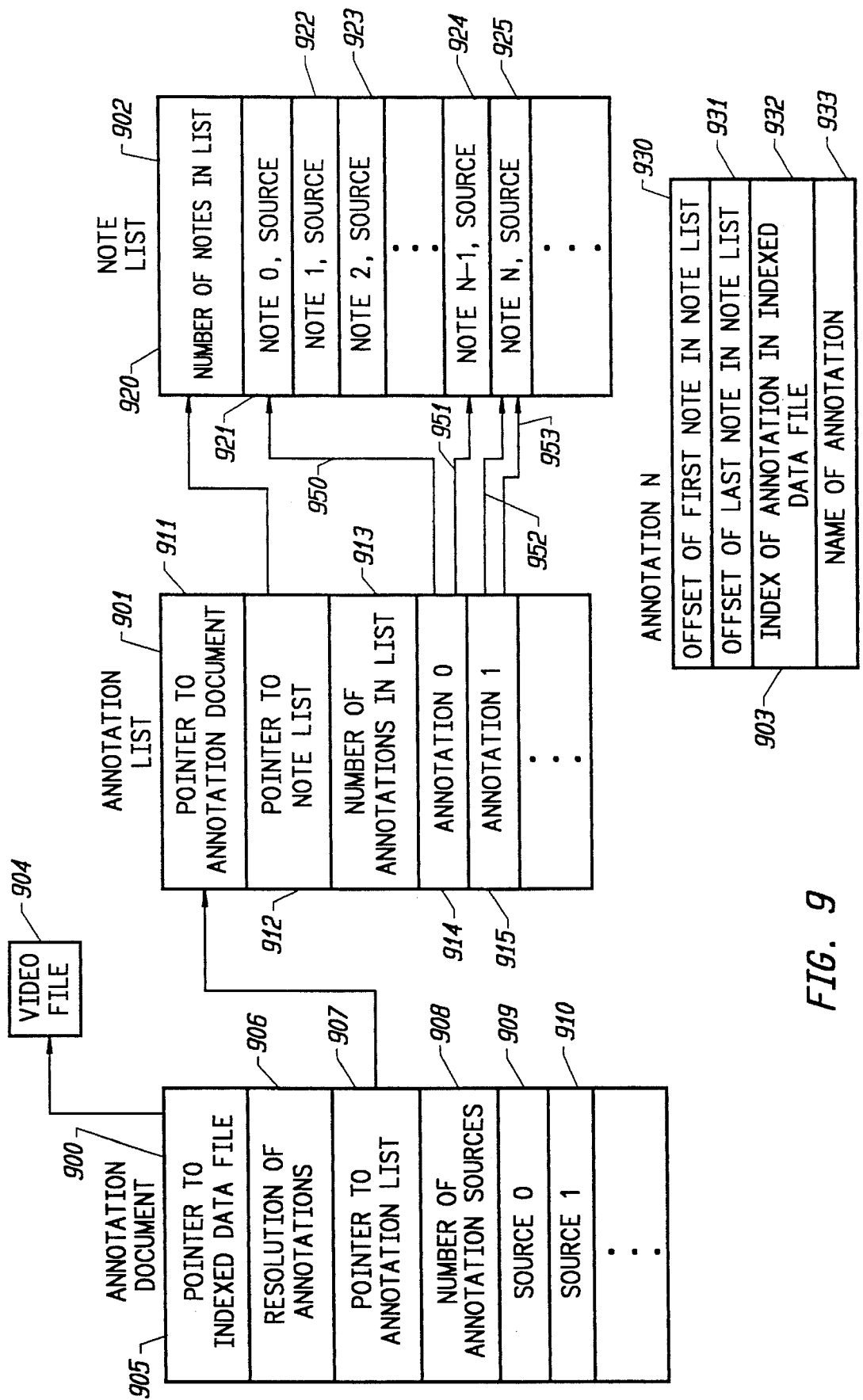
FIG. 9 is a diagram illustrating the data structures used according to one embodiment of the present invention.

FIG. 9 illustrates a data structure used according to one embodiment of the present invention. This data structure includes an annotation document, generally 900, an annotation list, generally 901, and a note list, generally 902. The annotation list includes a number of annotations which have the structure shown generally at 903.

The annotation document 900 includes a pointer 905 to the indexed data file, such as video file 904, for which the annotation document has been created. Also, a field 906 in the annotation document 900 indicates the resolution of the annotations. The next field 907 provides a pointer to the annotation list 901 for this annotation document 900. In an optional embodiment, the annotation document 900 will include a field 908 which indicates the number of independent sources of annotation data structures in the note list from which the annotation document 900 was created. If there are any such sources, then subsequent fields 909, 910 will provide the names of the sources. These sources, for instance, will constitute independently created annotation documents which have been merged into a single annotation document, having a structure shown at 900.

The annotation list 901 includes a first field 911 which points back to the annotation document 900. Also, a field 912 includes a pointer to the note list 902. A next field 913 indicates the number of annotations in the list. In this structure, an annotation has the structure shown at 903, and identifies the number of notes which have been created for a given frame in the video file 904. After field 913, the following fields 914, 915 include annotation structures, having the form shown at 903.

The note list 902 includes a first field 920 which indicates the number of notes in the list. Subsequent fields 921, 922, 923, 924, 925 comprise the actual annotation data structures for a corresponding frame. In the optional embodiment where merged annotation documents are used, each of the fields 921–925 also includes an indicator of the source of the note.

The annotations in the annotation list 901 have the structure shown at 903. Each annotation, such as "Annotation n", includes a first field 930 which indicates the offset of the first note in the note list 902 for the annotation. A second field 931 indicates the offset in the note list 902 of the last note for this annotation. The next field 932 provides an index of the annotation in the video file 904, identifying the particular frame to which the annotation applies. Finally, a name of the annotation is provided in field 933.

Thus, in FIG. 9, Annotation 0 has a pointer 950 to Note 0, and a pointer 951 to Note N-1, setting up an annotation for a particular frame having N annotation data structures. Annotation 1 has two pointers 952, 953 to Note N, setting up a one note annotation for a particular frame.

A preferred system will include a routine to create a merged annotation document from a plurality of independently created annotation documents. To merge the annotation documents, the fields 908–910 are added to the annotation document 900. Each of the independently created annotation documents is then scanned in order of the indexing structure for the video file 904 to find all of the annotations to be added to the annotation list from all of the various sources. If two sources have an annotation for a single index, then such annotations are placed in order in the note list, and a single annotation structure, such as structure 903, replaces the two previous annotations in the annotation list. By storing the source field with the note list, the independently created annotations can be separated by a reverse process.

The ability to merge the annotation files provides a critical advantage to the present invention over prior art editing techniques. That is, a number of independently created annotations can be merged and viewed in a single viewing of the indexed data structure. This ability to merge is critical for long movies and the like, where one does not want to sit through the same movie several times to see the comments of a number of commenters.

Although the preferred system has been developed for multimedia applications which include full motion digital video as a major component of the file of indexed data structures, the present invention may be applied to other indexed data structures as well. For instance, large image files or text process documents which are indexed by page may be annotated using this technique. Music may be annotated using this technique, so long as the music file is indexed, such as by verse or by bar. The invention is well suited to annotating any large indexed data file, where altering the original data file is not desirable, or not possible. It may not be possible to alter an original file, for instance, where the original data file is stored in a read only memory, or exceeds the working storage capabilities of the system doing the altering.

As mentioned above, an organization using the present invention can distribute high quality multimedia content or other large indexed data files, over virtually any type of network, with the capability of transporting annotations apart from the multimedia content. The present invention greatly facilitates the development of complex multimedia products, such as movies, animated films, commercials, multimedia software, music, audio tracks, still images, graphics, text, and other forms of multimedia content. Once the content has been distributed, annotations can be transported amongst collaborative developers without altering the original content, and without requiring redistribution of the content every time an annotation is executed.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

APPENDIX
Copyright, emotion, inc., 1994

```
//messages passed from media manager to application
enum AnnotationMessage {
        messOpenAnnotation,    //open annotation at the index indicated
        messCloseAnnotation,   //close annotation
        messDrawAnnotation     //redraw the annotation for the current index
};
//definition of routine to pass information from media manager to application
typedef pascal void (*AnnotationProcPtr) (
        AnnotationMessage message, void *data, void *staticLink);
//commands for the TMovie::DoCommand method
enum TMovieCommand
(
        .
        .
        .
        mvPlay,       //start to play the movie
        mvUpdate;     //update the movie (in response to update event)
        .
        .
        .
};
//class which encapsulates the annotated QuickTime movie
class TMovie
{
public:
        .
        .
        .
        TView *fView;                          //class representing where movie is located on screen
        Movie Fmovie;                          //the QuickTime movie
        MovieController fMovie Controller;
                                               //the QuickTime controller for the movie
        AnnotationProcPtr fAnnotationProcPtr;
                                               //entry point to application to send messages
        void *fAnnotationStaticLink;
                                               //static value always passed back to the application
        TMovieIdler *fMovieIdler;              //class which is called at regular intervals to service
                                               //the QuickTime movie (see definition below)
        .
        .
        .
        void DoCommand (TMovieCommand theMovieCommand);
                                               //method used by the application to manipulate the movie
        .
        .
        .
};
//class which allows the QuickTime movie to be serviced at regular intervals
class TMovieIdler
(
public:
        .
        .
        TView *fView;                          //class representing where movie is located on screen
        Movie fMovie;                          //the QuickTime movie
        MovieController fController;
                                               //the QuickTime controller for the movie
```

-continued

APPENDIX
Copyright, emotion, inc., 1994

```
    AnnotationProcPtr fAnnotationProcPtr;
                                            //entry point to application to send messages
    void *fAnnotationStaticLink;
                                            //static value always passed back to the application
    Boolean fMovieIsDone;                   //flag which is TRUE when the movie is stopped
                                            //and FALSE when the movie is playing
    TMovie *fTMovie;                        //pointer back to the movie object
    .
    .
    .
    void DoIdle();
    .
    .
    .
};
void TMovie::DoCommand(TMovieCommand theMovieCommand, void *theValue)
{
    switch (theMovieCommand)
    {
        .
        .
        .
        case mvUpdate:      //response to update event
            //tell Quicktime to redraw the movie
            MCDoAction(fMovieController, mcActionDraw, (void*)fView->GetGrafPort());
            //tell the application to redraw the annotations
            fAnnotationProcPtr (messDrawAnnotation, NULL, fAnnotationStaticLink);
            break;
        case mvPlay:        //response to user hitting play button
        {
            Fixed rate;
            //tell the application to close the annotation (the movie is about to start)
            fAnnotationProcPtr (messCloseAnnotation, NULL, fAnnotationStaticLink);
            //get playback rate for the QuickTime movie
            rate = GetMoviePreferredRate(fMovie);
            //tell Quicktime to play the movie
            MCDoAction (fMovieController, mcActionPlay, (void*)rate));
            //let the idler know that the movie is playing
            fMovieIdler->fMovieIsDone = FALSE;
            break
        }
        .
        .
        .
    }
) //TMovie::DoCommand
void TMovieIdler::DoIdle()
{
    //prepare the drawing environment of the movie (i.e. Focus)
    fView->Focus();
    //tell QuickTime to service the movie
    MCIdle (fController);
    //if the movie is not done (i.e. it is playing), check to see if it stopped
    if (!fMovieIsDone)
    {
        Fixed rate;
        //get the current play back rate of the movie from QuickTime
        //if the rate is zero, then the movie has stopped
        //and the application needs to be informed
        if ((MCDoAction (fController,
                mcActionGetPlayRate, (void*) &Rate) == noErr) && (rate == 0))
        {
            TimeValue timeValue;
            //ensure the movie is stopped by telling QuickTime to set playback rate to zero
            MCDoAction (fController, mcActionPlay, (void*) 0);
            //get the current time (i.e. frame) for the movie
            timeValue = GetMovieTime (fMovie->fMovie, NULL);
            //idle the movie one more time before opening the annotations
            MCIdle (fController);
            //tell the application to open annotations at the current index (i.e. frame)
            fAnnotationProcPtr (messOpenAnnotation, &timeValue, fAnnotationStaticLink);
            //set the flag so the movie done
            fMovieIsDone = TRUE;
        )
    }
) //TmovieIdler::DoIdle
```

What is claimed is:

1. A method of annotation for a file of indexed data structures, data structures in the file having an index value, comprising:

displaying the file of indexed data structures using a file display routine;

selecting, in response to user input, an indexed data structure to be annotated from the file of indexed data structures being displayed;

creating, in response to user input, an annotation data structure using an annotation routine without modifying the selected data structure, the annotation data structure including a graphical element for display overlaying the selected data structure and an indication of an index value for the selected data structure;

storing the annotation data structure in an annotation memory;

monitoring the annotation memory while displaying the file of indexed data structures to detect annotation data structures for indexed data structures currently being displayed; and overlaying the indexed data structure on the display with the graphical element of the detected annotation data structure without modifying the indexed data structure.

2. The method of claim 1, wherein the indexed data structures comprise video frames, and the index value identifies an individual video frame.

3. The method of claim 1, wherein the file of indexed data structures comprises a full motion video file including video frames, and the index value identifies an individual video frame.

4. The method of claim 3, wherein the step of displaying the file of indexed data structures includes playing the full motion video file.

5. The method of claim 4, including stopping the playing of the full motion video file at the current video frame during the step of overlaying.

6. The method of claim 1, including providing a graphical user interface having a window for displaying the indexed data structures, and an annotation control window, the annotation control window including graphical input elements providing access to tools for providing user input in the step of selecting and the step of creating.

7. The method of claim 1, wherein the step of creating includes inputting bitmap drawing data to the annotation data structure, the bitmap drawing data to be used in the graphical element.

8. The method of claim 1, wherein the step of creating includes inputting text data to the annotation data structure, the text data to be used in the graphical element.

9. The method of claim 1, wherein the step of creating includes inputting audio data to the annotation data structure, and providing an icon to be used in the graphical element indicating presence of the audio data in the annotation data structure.

10. The method of claim 1, wherein the step of creating includes inputting coordinate data to the annotation data structure, the coordinate data indicating a position on the selected data structure at which the graphical element overlies the data structure on the display.

11. The method of claim 1, wherein the annotation memory stores a plurality of independently created files of annotation data structures, and the step of monitoring includes scanning the annotation data structures from plurality of independently created files to detect annotation data structures for the indexed data structures currently being displayed, and the step of overlaying includes overlaying the current indexed data structure with detected annotation data structures from the plurality of independently created files.

12. The method of claim 1, wherein the annotation memory stores a plurality of independently created files of annotation data structures, and further including merging the independently created files in the annotation memory to form a merged annotation document for the indexed data structure prior to the step of displaying.

13. The method of claim 1, including establishing in the annotation memory an annotation document for the indexed data file, the annotation document including a list of annotations indexed to corresponding indexed data structures, the annotations including one or more annotation data structures for the corresponding indexed data structure, and wherein the step of storing the annotation data structure in an annotation memory includes adding the annotation data structure to the list of annotations.

14. The method of claim 13, wherein the annotation memory stores a plurality of independently created annotation documents, and further including merging the independently created annotation documents in the annotation memory to form a merged annotation document for the indexed data structure prior to the step of displaying.

15. A method of annotation for a file of full motion video having indexed frames of video data, frames in the file having an index value, comprising:

playing the file of full motion video on a display using a display routine;

selecting, in response to user input, a video frame to be annotated from the file being played;

creating, in response to user input, an annotation data structure using an annotation routine without modifying the video frame, the annotation data structure including a graphical element for display overlaying the selected video frame and an indication of an index value for the selected video frame;

storing the annotation data structure in an annotation memory;

monitoring the annotation memory while playing the file of full motion video to detect annotation structures for indexed video frames currently being displayed;

overlaying the video frame on the display with the graphical element of the annotation data structure without modifying the video frame; and providing a graphical user interface having a window for displaying the full motion video being played, and an annotation control window, the annotation control window including graphical input elements providing access to tools for providing user input in the step of selecting and the step of creating.

16. The method of claim 15, wherein the tools include a drawing tool for inputting bitmap drawing data to the annotation data structure, the bitmap drawing data to be used in the graphical element.

17. The method of claim 15, wherein the tools include a text input tool for inputting text data to the annotation data structure, the text data to be used in the graphical element.

18. The method of claim 15, wherein the tools include an audio input tool for inputting audio data to the annotation data structure, and providing an icon to be used in the graphical element indicating presence of the audio data in the annotation data structure.

19. The method of claim 15, wherein the tools include a pointer tool for inputting coordinate data to the annotation data structure, the coordinate data indicating a position on the selected video frame at which the graphical element overlies the video frame on the display.

20. The method of claim 15, including stopping the playing of the full motion video file at the current video frame during the step of overlaying.

21. The method of claim 15, wherein the annotation memory stores a plurality of independently created files of annotation data structures, and the step of monitoring includes scanning the annotation data structures from plurality of independently created files to detect annotation data structures for the indexed video frames currently being displayed, and the step of overlaying includes overlaying the current video frame with detected annotation data structures from the plurality of independently created files.

22. The method of claim 15, wherein the annotation memory stores a plurality of independently created files of annotation data structures, and further including merging the independently created files in the annotation memory to form a merged annotation document for the file of full motion video prior to the step of displaying.

23. The method of claim 15, including establishing in the annotation memory an annotation document for the file of full motion video, the annotation document including a list of annotations indexed to corresponding indexed video frames, the annotations including one or more annotation data structures for the corresponding indexed video frame, and wherein the step of storing the annotation data structure in an annotation memory includes adding the annotation data structure to the list of annotations.

24. The method of claim 23, wherein the annotation memory stores a plurality of independently created annotation documents, and further including merging the independently created annotation documents in the annotation memory to form a merged annotation document for the indexed file of full motion video prior to the step of displaying.

25. An apparatus for display and annotation of a file of indexed data structures, data structures in the file having an index value, comprising:

a display;

a media manager, including resources to display the file of indexed data structures on the display;

a device for user input;

an annotation manager, including resources to select, in response to user input, an indexed data structure to be annotated from the file of indexed data structures being displayed, and resources to create, in response to user input, an annotation data structure without modifying the selected data structure and to store the annotation data structure in an annotation memory, the annotation data structure including a graphical element for display overlaying the selected data structure and an indication of an index value for the selected data structure; and play back resources, coupled with the media manager and the annotation manager, to monitor the annotation memory while the file of indexed data structures is displayed by the media manager to detect annotation data structures for indexed data structures currently being displayed, and to overlay the indexed data structure on the display with the graphical element of the annotation data structure without modifying the indexed data structure.

26. The apparatus of claim 25,, wherein the indexed data structures comprise video frames, and the index identifies individual video frames.

27. The apparatus of claim 25, wherein the file of indexed data structures comprises a full motion video file including video frames, and the index identifies individual video frames.

28. The apparatus of claim 25, wherein the media manager comprises resources to play the full motion video file.

29. The apparatus of claim 28, wherein the play back resources include resources to signal the media manager to stop the playing of the full motion video file at the current indexed data structure in response to detection of an annotation data structure for the current indexed data structure.

30. The apparatus of claim 25, wherein the user input includes a graphical user interface having a window for displaying the indexed data structures by the media manager, and an annotation control window, the annotation control window including graphical input elements providing access to tools, responsive to the device for user input, for providing user input to the annotation manager.

31. The apparatus of claim 25, including a drawing tool for inputting bitmap drawing data for the annotation data structure, the bitmap drawing data to be used in the graphical element.

32. The apparatus of claim 25, including a text input tool for inputting text data for the annotation data structure, the text data to be used in the graphical element.

33. The apparatus of claim 25, including an audio input tool for inputting audio data for the annotation data structure, and the annotation manager includes resources to provide a icon to be used in the graphical element indicating presence of the audio data in the annotation data structure.

34. The apparatus of claim 25, including a pointer tool for inputting coordinate data to the annotation data structure, the coordinate data indicating a position on the selected indexed data structure at which the graphical element overlies the indexed data structure on the display.

35. The apparatus of claim 25, wherein the annotation memory stores a plurality of independently created files of annotation data structures, and the playback resources include a routine to scan the annotation data structures from plurality of independently created files to detect annotation data structures for the indexed data structures currently being displayed, and to overlay the current indexed data structure with detected annotation data structures from the plurality of independently created files.

36. The apparatus of claim 25, wherein the annotation memory stores a plurality of independently created files of annotation data structures, and further including resources merge the independently created files in the annotation memory to form a merged annotation document for the indexed data structure.

37. The apparatus of claim 25, including resources coupled with the annotation memory to establish an annotation document for the indexed data file, the annotation document including a list of annotations indexed to corresponding indexed data structures, the annotations including one or more annotation data structures for the corresponding indexed data structure, and wherein the resources which store the annotation data structure in an annotation memory add the annotation data structure to the list of annotations.

38. The method of claim 37, wherein the annotation memory stores a plurality of independently created annotation documents, and further including a routine to merge the independently created annotation documents in the annotation memory to form a merged annotation document for the indexed data structure.

39. An apparatus for display and annotation of a file of full motion video, frames of video data in the file having an index value, comprising:

a display;

a media manager, including resources to display the file of full motion video on the display;

an annotation manager, including resources to select, in response to user input, an indexed frame of video data to be annotated from the file of full motion video being displayed, and resources to create, in response to user input, an annotation data structure without modifying the selected frame and to store the annotation data structure in an annotation memory, the annotation data structure including a graphical element for display overlaying the selected frame and an indication of an index value for the selected frame;

a user input device, coupled with the annotation manager, including tools for providing user input to the annotation manager, and a graphical user interface having a window for displaying the file of full motion video by the media manager, and an annotation control window, the annotation control window including graphical input elements providing access to the tools for providing user input to the annotation manager; and play back resources, coupled with the media manager and the annotation manager, to monitor the annotation memory while the file of full motion video is displayed by the media manager to detect annotation data structures for flames currently being displayed, and to overlay the frame on the display with the graphical element of the annotation data structure without modifying the frame.

40. The apparatus of claim 39, wherein the tools include a drawing tool for inputting bitmap drawing data to the annotation data structure, the bitmap drawing data to be used in the graphical element.

41. The apparatus of claim 39, wherein the tools include a text input tool for inputting text data to the annotation data structure, the text data to be used in the graphical element.

42. The apparatus of claim 39, wherein the tools include an audio input tool for inputting audio data the annotation data structure, and the annotation manager includes resources to provide a icon to be used in the graphical element indicating presence of the audio data in the annotation data structure.

43. The apparatus of claim 39, wherein the tools include a pointer tool for inputting coordinate data to the annotation data structure, the coordinate data indicating a position on the selected data structure at which the graphical element overlies the data structure on the display.

44. The apparatus of claim 39, wherein the play back resources include resources to signal the media manager to stop the playing of the full motion video file at the current frame in response to detection of an annotation data structure for the current frame.

45. The apparatus of claim 39, wherein the annotation memory stores a plurality of independently created files of annotation data structures, and the playback resources include a routine to scan the annotation data structures from plurality of independently created files to detect annotation data structures for the indexed video frames currently being displayed, and to overlay the current video frame with detected annotation data structures from the plurality of independently created files.

46. The apparatus of claim 39, wherein the annotation memory stores a plurality of independently created files of annotation data structures, and further including resources to merge the independently created files in the annotation memory to form a merged annotation document for the file of full motion video.

47. The apparatus of claim 39, including resources coupled with the annotation memory to establish an annotation document for the file of full motion video, the annotation document including a list of annotations indexed to corresponding indexed video frames, the annotations including one or more annotation data structures for the corresponding indexed video frame, and the resources which store the annotation data structure in an annotation memory includes a routine to add the annotation data structure to the list of annotations.

48. The apparatus of claim 47, wherein the annotation memory stores a plurality of independently created annotation documents, and further including a routine to merge the independently created annotation documents in the annotation memory to form a merged annotation document for the indexed file of full motion video.

* * * * *